(12) United States Patent
Oswell

(10) Patent No.: US 12,365,275 B2
(45) Date of Patent: Jul. 22, 2025

(54) SUSPENSION COMPONENT

(71) Applicant: ROSWELL CANADA INC., Acheson (CA)

(72) Inventor: Robert E. Oswell, Merritt Island, FL (US)

(73) Assignee: ROSWELL CANADA INC., Acheson (CA)

( * ) Notice: Subject to any disclaimer, the term of this patent is extended or adjusted under 35 U.S.C. 154(b) by 414 days.

(21) Appl. No.: 17/881,079

(22) Filed: Aug. 4, 2022

(65) Prior Publication Data

US 2023/0075331 A1    Mar. 9, 2023

Related U.S. Application Data

(60) Provisional application No. 63/240,484, filed on Sep. 3, 2021.

(51) Int. Cl.
| | |
|---|---|
| B60N 2/54 | (2006.01) |
| B60N 2/50 | (2006.01) |
| B63B 29/04 | (2006.01) |
| F16F 3/08 | (2006.01) |
| F16F 3/087 | (2006.01) |

(52) U.S. Cl.
CPC ............ *B60N 2/542* (2013.01); *B60N 2/502* (2013.01); *B60N 2/544* (2013.01); *B63B 29/04* (2013.01); *F16F 3/0873* (2013.01); *B63B 2029/043* (2013.01)

(58) Field of Classification Search
CPC ........ B60N 2/542; B60N 2/502; B60N 5/544; B60N 2/164; B60N 2002/247; B60N 2/0284; B60N 2/24; B60N 2/433; B60N 2/505; B60N 2/508; B60N 2/62; B60N 3/06; B63B 29/04; F16F 3/0873; F16F 1/377; F16F 3/10; F16F 15/067; F16F 15/085
USPC .................................................... 267/33, 131
See application file for complete search history.

(56) References Cited

U.S. PATENT DOCUMENTS 2,056,957 A * 10/1936 Colbridge .............. A47B 91/04
248/188.9
2,415,765 A *  2/1947 Thur ...................... A47C 27/20
5/246

(Continued)

FOREIGN PATENT DOCUMENTS

| CA | 2516560 A1 | 11/2004 |
| GB | 2309894 B | 2/1997 |

OTHER PUBLICATIONS

Electric Helm Seat Pedestal Marine Tech.wmv, YouTube, printed from Internet Nov. 15, 2022, 3 pages.

(Continued)

*Primary Examiner* — Robert A. Siconolfi
*Assistant Examiner* — James K Hsiao
(74) *Attorney, Agent, or Firm* — Timothy H. Van Dyke; Wolter Van Dyke Davis, PLLC

(57) ABSTRACT

A suspension component (730), including: an elastomeric component top member (832); an elastomeric component bottom member (830); and a plurality of elastomeric zig-zag columnar elements (800). The elastomeric zig-zag columnar elements connect the elastomeric component top member to the elastomeric component bottom member and are separated from each other by a gap (806).

12 Claims, 14 Drawing Sheets

(56) References Cited

U.S. PATENT DOCUMENTS

| | | | | |
|---|---|---|---|---|
| 2,605,099 A | * | 7/1952 | Brown | F16F 3/12 220/666 |
| 2,660,423 A | * | 11/1953 | Roy | F16F 3/10 267/152 |
| 2,687,269 A | * | 8/1954 | Titus | F16F 3/10 267/140.11 |
| 2,742,081 A | * | 4/1956 | Norman | B62J 1/02 297/214 |
| 3,075,736 A | | 1/1963 | Freedman | |
| 3,361,467 A | * | 1/1968 | Ludwikowski | B60R 19/36 267/140 |
| 3,428,976 A | | 2/1969 | Robinson | |
| 3,536,313 A | | 10/1970 | Rice | |
| 3,704,352 A | * | 11/1972 | Fontaine | B60N 2/0033 200/85 A |
| 3,758,064 A | | 9/1973 | Sawaki | |
| 4,194,255 A | * | 3/1980 | Poppe | A47C 27/065 428/116 |
| 4,356,992 A | * | 11/1982 | Benkert | F16F 15/067 248/573 |
| 4,361,741 A | * | 11/1982 | Leskoverc | B66F 9/20 200/85 A |
| 4,451,079 A | * | 5/1984 | Takahashi | B62D 33/067 296/190.07 |
| 4,595,023 A | * | 6/1986 | Bonnet | G01P 13/00 600/595 |
| 4,629,253 A | * | 12/1986 | Williams | F04B 33/00 297/DIG. 8 |
| 4,793,597 A | * | 12/1988 | Smith | B60G 11/52 267/179 |
| 4,903,610 A | * | 2/1990 | Matsumoto | H01L 21/6773 104/118 |
| 5,154,402 A | | 10/1992 | Hill et al. | |
| 5,364,086 A | * | 11/1994 | Paton | B60G 11/465 267/35 |
| 5,367,978 A | | 11/1994 | Mardikian | |
| 5,463,972 A | | 11/1995 | Gezari et al. | |
| 5,553,911 A | * | 9/1996 | Bodin | B62D 33/0604 296/190.07 |
| 5,588,165 A | * | 12/1996 | Fromme | A47C 23/002 5/255 |
| 5,598,788 A | | 2/1997 | Jonker | |
| 5,649,693 A | * | 7/1997 | Busby | B62K 25/04 267/141.1 |
| 5,667,202 A | * | 9/1997 | Gwinn | F16F 3/10 267/152 |
| 5,765,802 A | * | 6/1998 | Bostrom | B60N 2/502 248/419 |
| 5,899,780 A | | 5/1999 | Robbins | |
| 6,006,449 A | * | 12/1999 | Orlowski | A43B 13/182 36/38 |
| 6,042,093 A | * | 3/2000 | Garelick | B63B 17/0081 267/117 |
| 6,170,914 B1 | | 1/2001 | Chang | |
| 6,237,901 B1 | * | 5/2001 | Bianchi | B60G 11/48 267/286 |
| 6,457,261 B1 | * | 10/2002 | Crary | A43B 13/181 36/137 |
| 6,715,592 B2 | * | 4/2004 | Suzuki | B60R 21/04 296/187.05 |
| 6,749,187 B2 | * | 6/2004 | Yang | A43B 13/182 267/249 |
| 6,763,774 B1 | | 7/2004 | Ranieri et al. | |
| 6,786,172 B1 | | 9/2004 | Loffler | |
| 6,866,340 B1 | | 3/2005 | Robertshaw | |
| 6,880,483 B2 | | 4/2005 | Fedders | |
| 6,988,703 B2 | | 1/2006 | Ropp | |
| 7,249,662 B2 | * | 7/2007 | Itou | F16F 7/12 296/187.05 |
| 7,383,786 B2 | | 6/2008 | Giannasca | |
| 7,517,018 B2 | | 4/2009 | Therer et al. | |
| 7,758,027 B2 | * | 7/2010 | Yama | F16F 1/128 267/293 |
| 8,292,368 B1 | | 10/2012 | Yarbrough | |
| 8,517,466 B1 | | 8/2013 | Wizorek et al. | |
| 8,783,666 B2 | | 7/2014 | Kolb | |
| 8,894,152 B2 | | 11/2014 | Lorey | |
| 9,266,453 B2 | | 2/2016 | Haller et al. | |
| 9,296,321 B2 | | 3/2016 | Haller | |
| 9,764,788 B1 | * | 9/2017 | Sung | F16F 3/10 |
| 9,821,689 B2 | * | 11/2017 | Busboom | A01D 34/64 |
| 10,000,102 B2 | * | 6/2018 | Nolte | F16F 1/377 |
| 10,070,724 B2 | * | 9/2018 | Jacobs | A47C 1/126 |
| 10,173,560 B2 | * | 1/2019 | Ochs | B60N 2/0732 |
| 10,888,795 B1 | | 1/2021 | Gil et al. | |
| 10,959,487 B2 | * | 3/2021 | Brown | A43B 13/182 |
| 11,191,365 B2 | * | 12/2021 | Fromme-Ruthmann | A47C 23/002 |
| 11,577,632 B2 | * | 2/2023 | Brown | B60N 2/7094 |
| 2002/0100651 A1 | * | 8/2002 | Akiyama | F16F 7/121 188/371 |
| 2002/0163114 A1 | * | 11/2002 | Lobry | A47C 23/002 267/142 |
| 2003/0071502 A1 | * | 4/2003 | Marshall | A47C 3/0252 297/302.1 |
| 2009/0230743 A1 | * | 9/2009 | Derakhshan | A47C 9/002 297/329 |
| 2013/0206949 A1 | | 8/2013 | Archambault | |
| 2014/0265468 A1 | * | 9/2014 | Greenhill | B62J 1/02 297/208 |
| 2016/0368342 A1 | * | 12/2016 | Nolte | F16F 1/37 |
| 2018/0245652 A1 | * | 8/2018 | Al-Dahhan | F16F 1/377 |
| 2018/0305026 A1 | | 11/2018 | Yao et al. | |
| 2020/0055576 A1 | | 2/2020 | Oswell et al. | |
| 2020/0086773 A1 | * | 3/2020 | Mankame | B60N 2/7094 |
| 2020/0217388 A1 | * | 7/2020 | Nong | F16F 15/085 |
| 2021/0115992 A1 | * | 4/2021 | Nguyen | F16F 15/046 |
| 2022/0144152 A1 | * | 5/2022 | Gilmore | B60N 2/544 |
| 2024/0301937 A1 | * | 9/2024 | Nakazato | F16F 9/54 |

OTHER PUBLICATIONS

Helm Seat P 216 President, https://www.nauticexpo.com/prod/besenzoni-spa/product-21569-270887.html, printed from Internet Nov. 15, 2022, 5 pages.

* cited by examiner

SUSPENSION COMPONENT

FIELD OF THE INVENTION

The invention relates to a suspension component suitable for a seat suspension.

BACKGROUND OF THE INVENTION

A boat captain controls a boat in many diverse situations and may do so in a sitting position. Sea conditions can change the attitude of the boat. In addition, captains differ in height. Hence, seats with height adjustment are used. However, there is room for improvement.

BRIEF DESCRIPTION OF THE DRAWINGS

The invention is explained in the following description in view of the drawings that show.

DETAILED DESCRIPTION OF THE INVENTION

The present inventor has created a unique and innovative boat station that provides a wide range of operating positions for a boat captain. Specifically, the boat station includes at least one independently suspended seat that is disposed atop a height-adjustable base. The at least one independently suspended seat optionally includes a separate height adjustment as part of the independent suspension. The independent suspension may also optionally include a unique and innovative elastomeric element.

Figure 1:
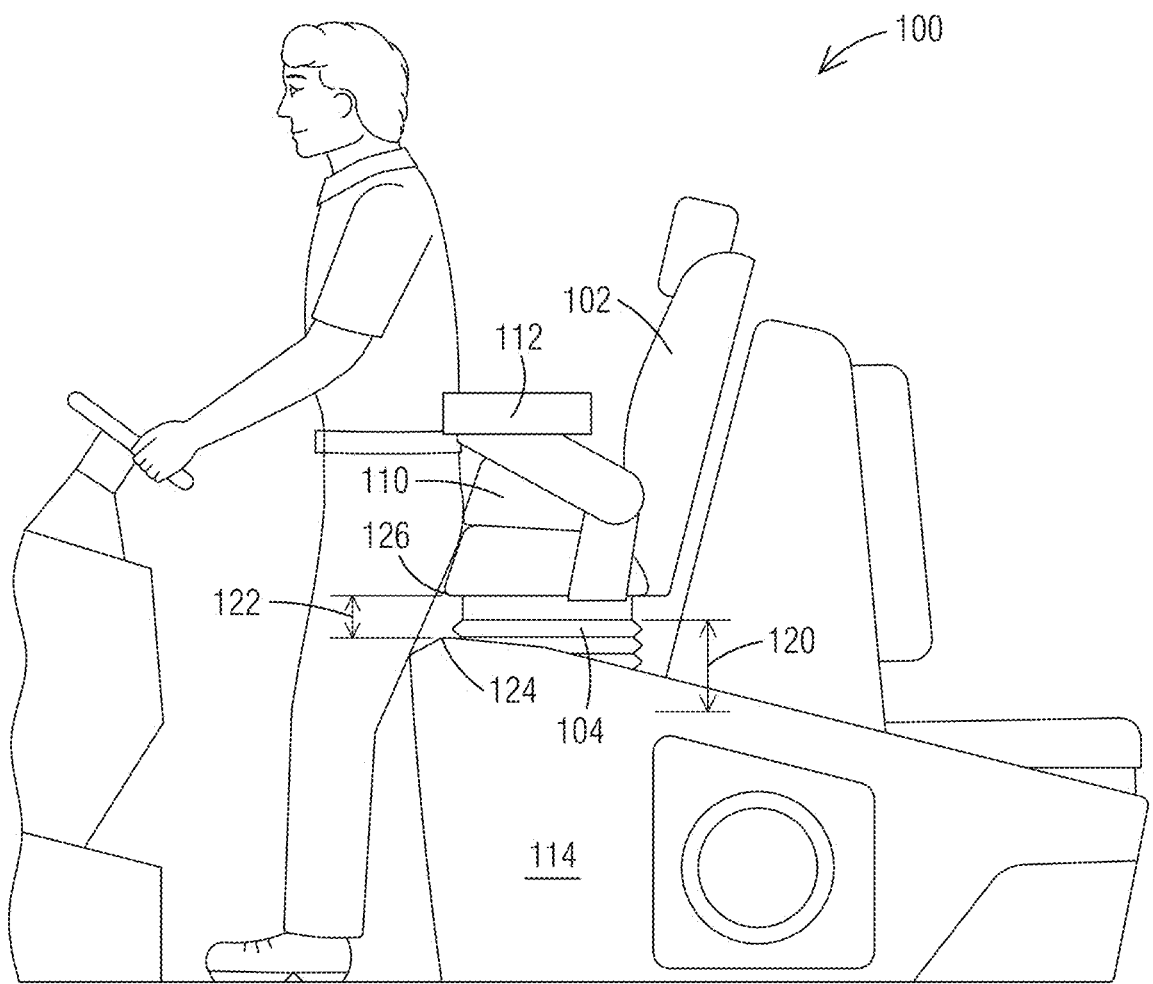
FIG. 1 shows an example embodiment of a boat station with an example embodiment of a seat on an example embodiment of an independent suspension on an example embodiment of a seat base assembly that is in a lowered position.
Figure 2:
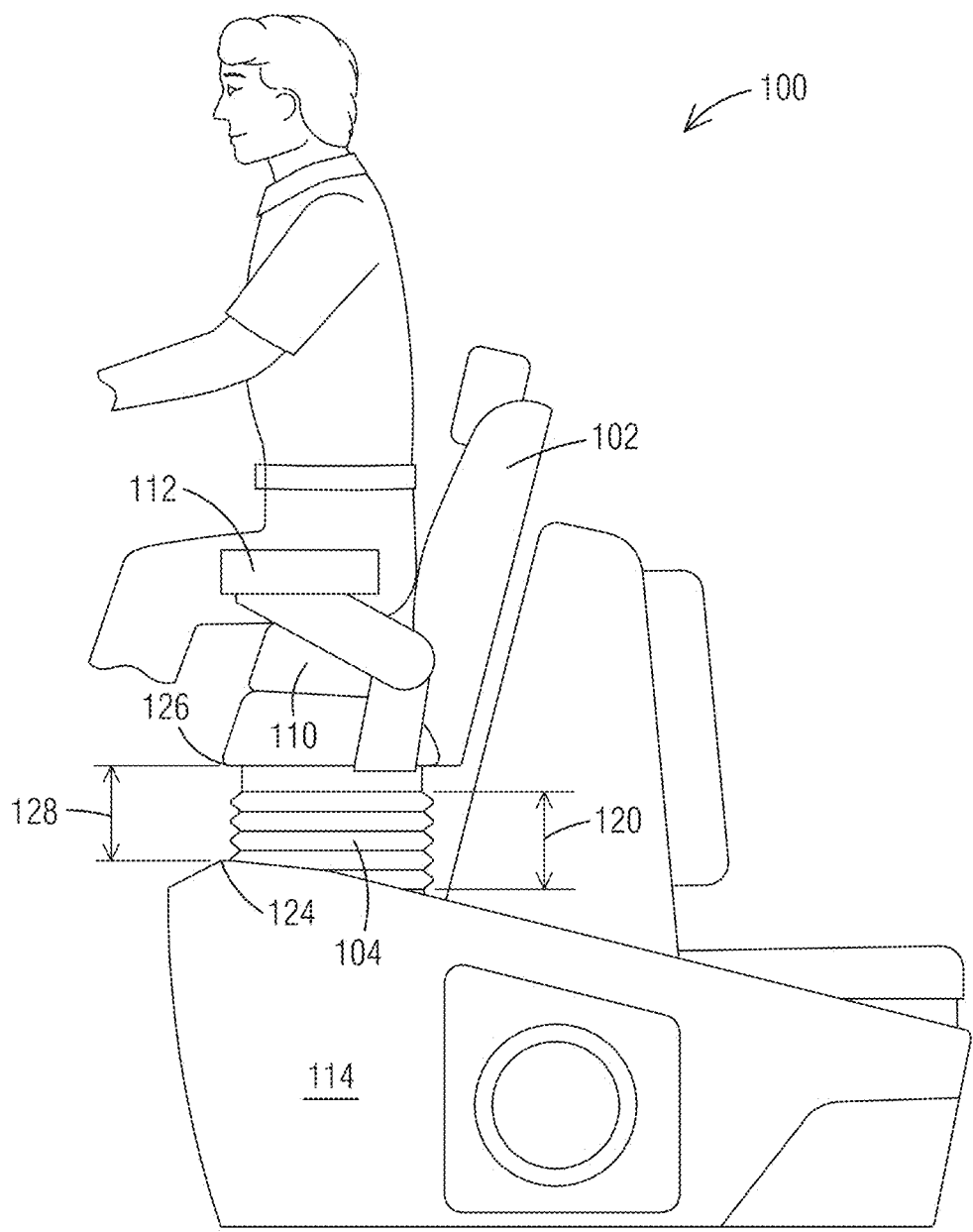
FIG. 2 shows the boat station of FIG. 1 with the seat base assembly in an upper position.
Figure 3:
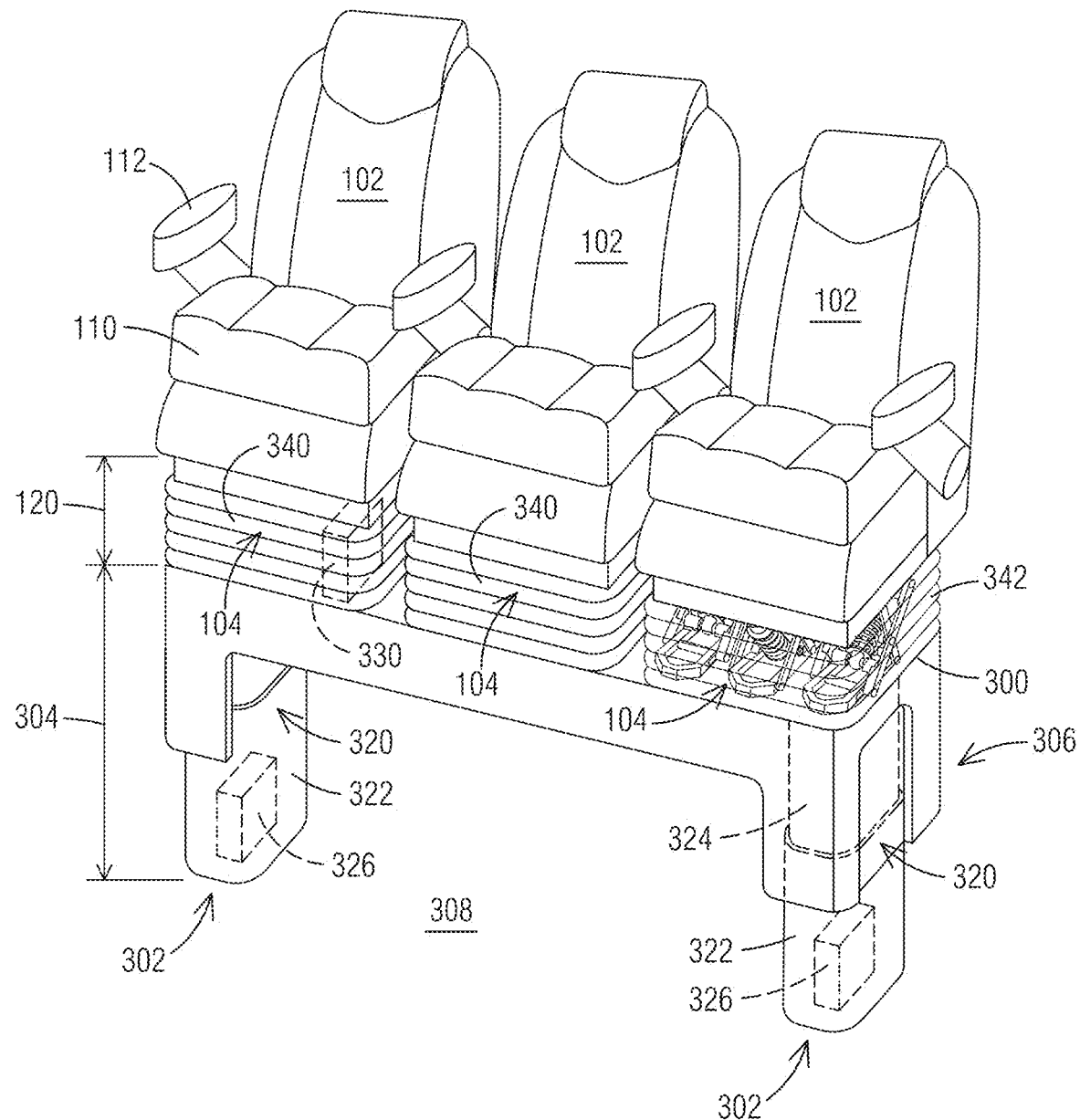
FIG. 3 shows the seat base assembly of the boat station of FIG. 1 in the upper position.

FIGS. 1-4 show an example embodiment of the boat station and components thereof. FIG. 1 shows an example embodiment of a boat station 100 with an example embodiment of a seat 102 on an example embodiment of an independent suspension assembly 104 on an example embodiment of a seat base assembly 306 (see FIG. 3) that is in a lowered position. FIG. 2 shows the boat station 100 with the seat base assembly 306 in an upper position. FIG. 3 shows the seat base assembly 306 in the upper position and supporting a row of three seats 102, although any number of seats 102 may be supported by one seat shelf 300. The seat 102 optionally includes a bolster 110 and arm rests 112. The seat base assembly 306 is disposed within a seat base console 114. The seat base assembly 306 and the seat base console 114 may be composed of fiberglass, carbon fiber, aluminum, steel, or the like.

The independent suspension assembly 104 defaults to an independent suspension height 120 and the independent suspension height 120 is the same in FIG. 1 and FIG. 2. When the seat base assembly 306 is in the lower position of FIG. 1, there is first distance 122 between a reference point 124 on the seat base console 114 and a reference point 126 on the seat 102. When the seat base assembly 306 is in the upper position of FIG. 2, there is second distance 128 between the reference point 124 on the seat base console 114 and the reference point 126 on the seat 102. The seat base assembly 306 is configured such that the second distance 128 is greater than the first distance 122 by from six (6) inches to as much as twenty (20) inches or more.

In an example embodiment, the seat base assembly 306 includes a seat shelf 300 on which the seats 102 and independent suspension assemblies 104 are disposed. The seat base assembly 306 further includes one or more actuators 302 that adjust a height 304 of the seat shelf 300 above, for example, a deck 308 of the boat. In the example embodiment shown, there are two actuators 302, one at each end of the seat shelf 300. However, there may be one actuator (e.g., centered), or more than two actuators.

In an example embodiment, the actuators 302 include a telescoping assembly 320 secured to the seat shelf 300. The telescoping assembly 320 includes two or more telescope members 322, 324 longitudinally moveable relative to one another for moving the seat shelf 300 between the lower position and the upper position. The telescoping assembly 320 further includes a motive component 326 (such as a piston, a motor, or the like) to effect the longitudinal movement of the two or more telescope members 322, 324. The motive component 326 may be powered (e.g. electrical or hydraulic motors), may be manually assisted (e.g. gas shock(s), spring(s)), or may be manually operated (e.g. hand crank etc.). Other actuators known to the artisan may be used.

In an example embodiment, a first telescope member of the two or more telescope members 322, 324 is at least partially hollow such that the first telescope member defines a channel. A second telescope member of the two or more telescope members 322, 324 may be at least partially disposed in the channel. The motive component 326 may be disposed within or adjacent the two or more telescope members 322, 324 and drive one telescope member relative to the other telescope member to create the telescoping action. Such a telescoping assembly is disclosed in U.S. patent application Ser. No. 16/540,770 published as US Publication number 2020/0055576, entitled "Telescoping Tower for a Boat", filed on Aug. 14, 2019, which is incorporated in its entirety herein.

In an example embodiment, one or more of the independent suspension assemblies 104 includes an independent suspension height adjustment mechanism 330 configured to adjust a height of the respective seat 102 relative to the seat shelf 300. The independent suspension height adjustment mechanism 330 may be incorporated into a shock/strut or may be a discrete mechanism. The independent suspension assembly 104 may include a rubber vinyl opaque boot 340 or a rubber vinyl translucent boot 342 (made of e.g., a transparent polyvinyl) to keep the mechanism clean etc.

Figure 4:
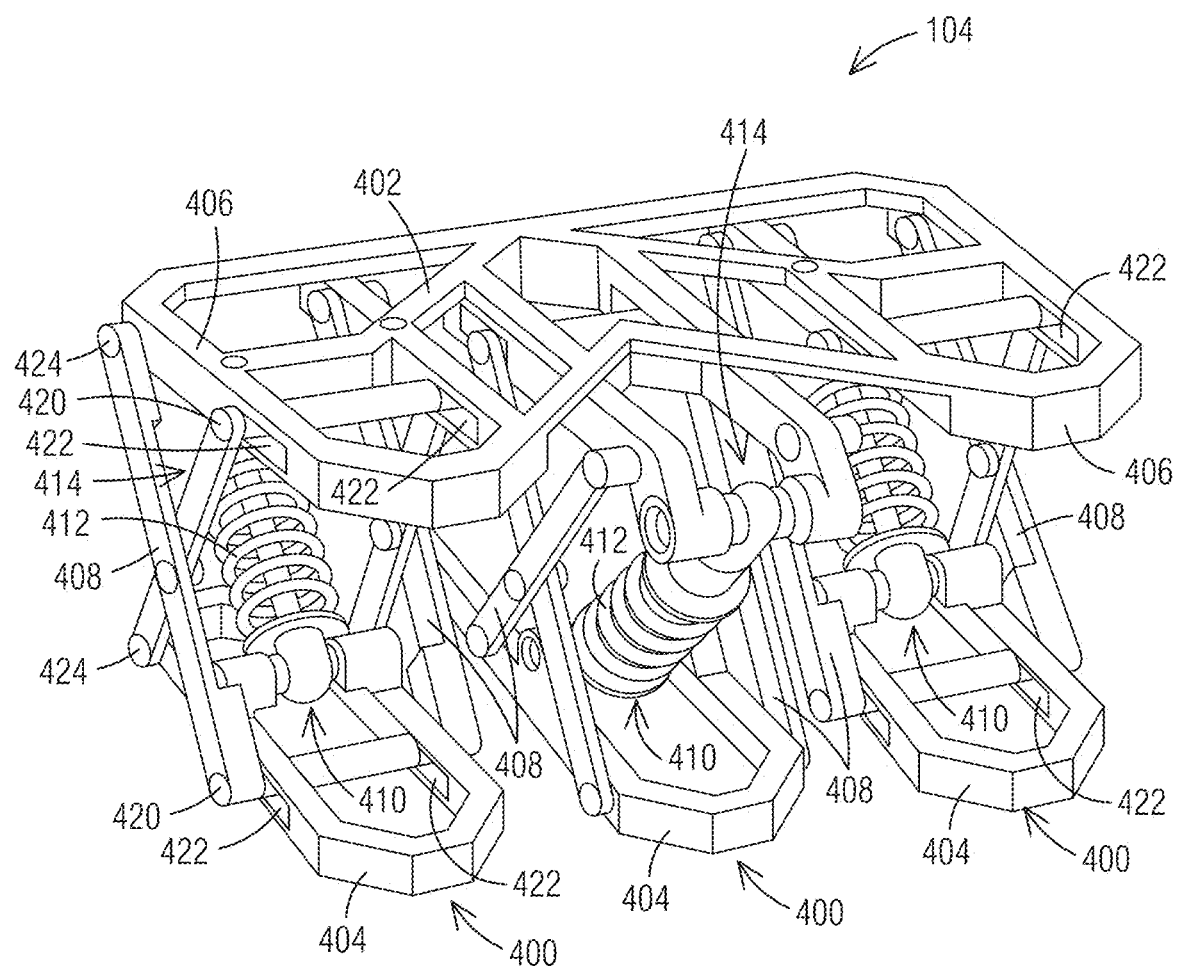
FIG. 4 shows an example embodiment of the independent suspension of FIG. 1.

FIG. 4 shows an example embodiment of the independent suspension assembly 104 that supports a respective seat 102. In this example embodiment, there are three suspension modules 400 interconnected via a connector member 402, but there may be one, two, or more than three suspension modules 400. Each suspension module 400 includes a suspension bottom member 404, a suspension top member 406 that supports the seat(s) 102, scissor mechanisms 408 connecting the suspension bottom member 404 to the suspension top member 406, and a spring/strut mechanism 410 connecting the suspension bottom member 404 to the suspension top member 406. Each spring/strut mechanism 410 includes a spring 412 (e.g., a coil spring) and optionally a damper 414. Although not shown in this example embodiment, the suspension module 400 may further include the independent suspension height adjustment mechanism 330. The suspension bottom member 404 and the suspension top member 406 may be composed of, for example, steel, aluminum, carbon fiber, or fiberglass.

When sufficient weight is applied to the suspension top member 406, free ends 420 of the scissor mechanisms 408 slide within slots 422 while fixed ends 424 remain fixed relative to their respective suspension member. This allows the suspension top member 406 to lower, thereby yielding to the applied weight. The spring 412 resists this yielding. The optional damper 414 dampens oscillations associated with the applied weight and the spring response. Alternately, or in addition to the independent suspension height adjustment mechanism 330, increasing the spring tension can increase the independent suspension height 120 while decreasing the spring tension can decrease the independent suspension height 120.

Figure 5:
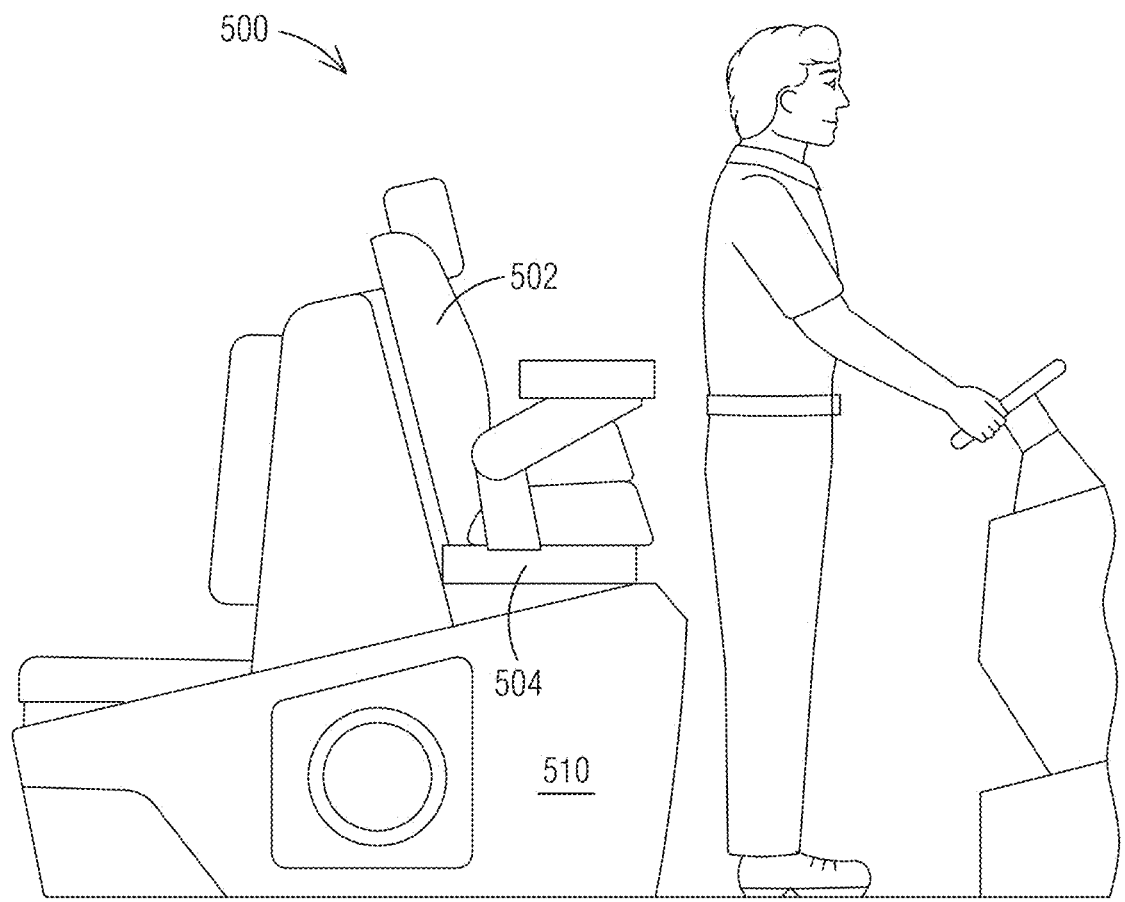
FIG. 5 shows an alternate example embodiment of a boat station with an alternate example embodiment of the seat on an alternate example embodiment of an independent suspension and an alternate example embodiment of the seat base assembly that is in the lowered position.
Figure 6:
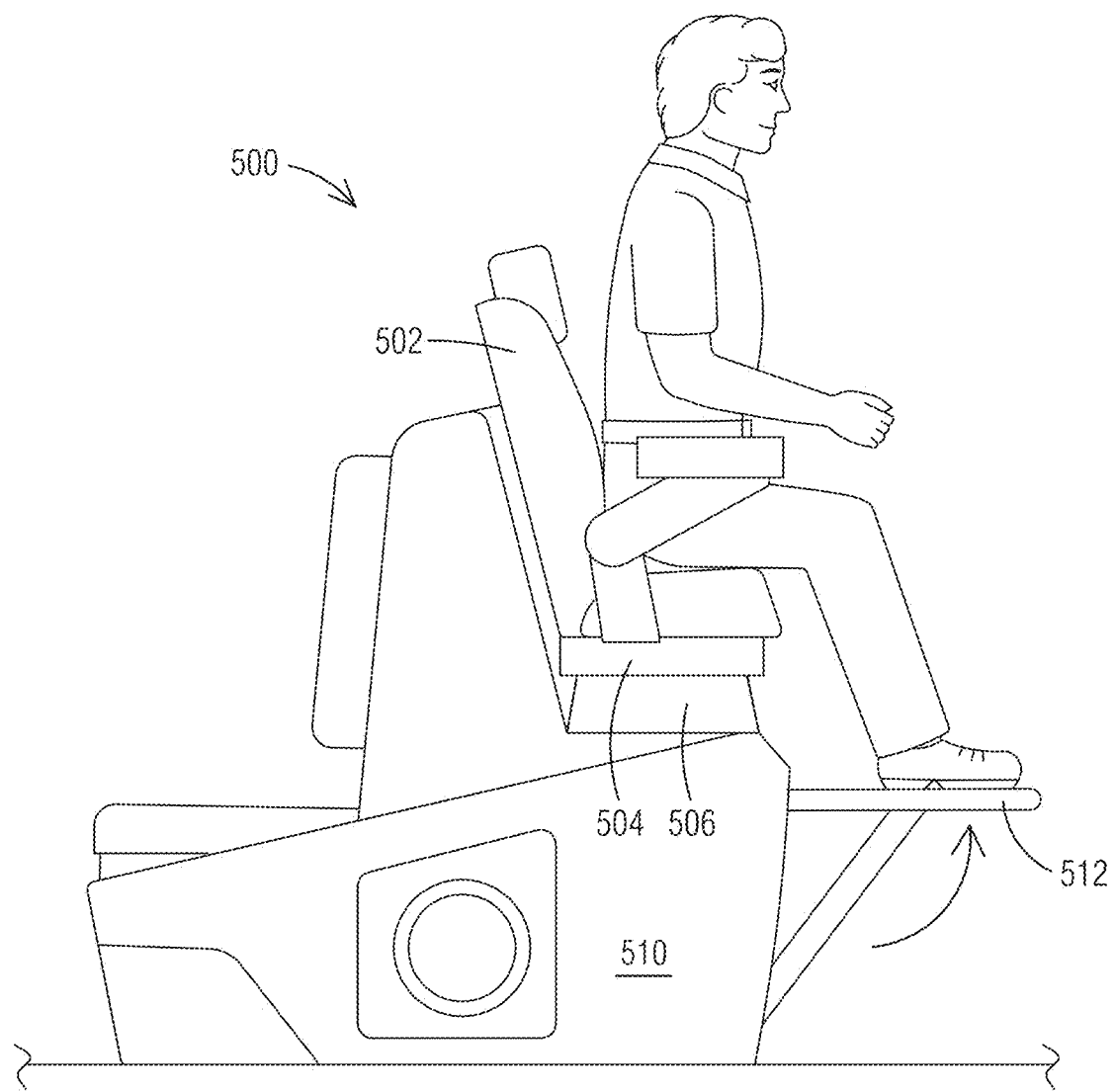
FIG. 6 shows the boat station of FIG. 5 with the seat base assembly in the upper position.

FIGS. 5 and 6 shown an alternate example embodiment of a boat station 500. FIG. 5 shows an alternate example embodiment of a boat station 500 with an alternate example embodiment of the seat 502 on an example embodiment of an independent suspension 504 and an alternate example embodiment of the seat base assembly 506 (see FIG. 6) that is in the lowered position (e.g. flush with the seat base console 510). The independent suspension 504 can be any embodiment disclosed herein or any suitable independent suspension.

FIG. 6 shows the boat station 500 with the seat base assembly 506 in the upper position and protruding from the seat base assembly 506. The seat base assembly 506 is disposed within the seat base console 510. The operation of this example embodiment of the seat base assembly 506 is similar to the operation described above for the seat base assembly 306 of FIG. 1. In at least the example embodiment of FIGS. 5-6, the seat base console 510 further includes a platform 512 that can be flipped up and locked in the upper position shown in FIG. 6. When in the upper position, the platform can function as a raised deck/floor for the captain.

Figure 7:
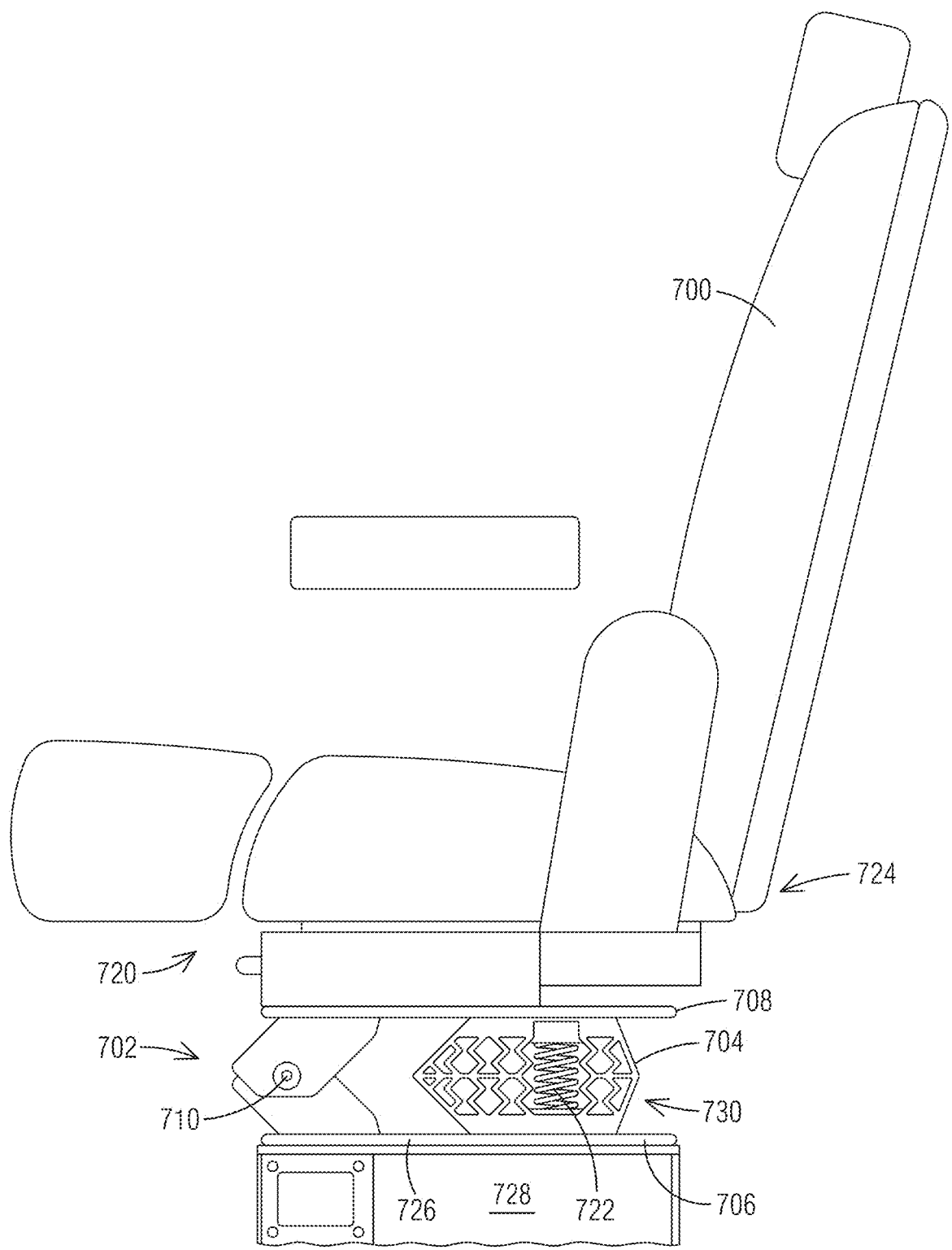
FIG. 7 shows an example embodiment of a seat and an example embodiment of an independent suspension with an example embodiment of a suspension component having an elastomeric element.
Figure 8:
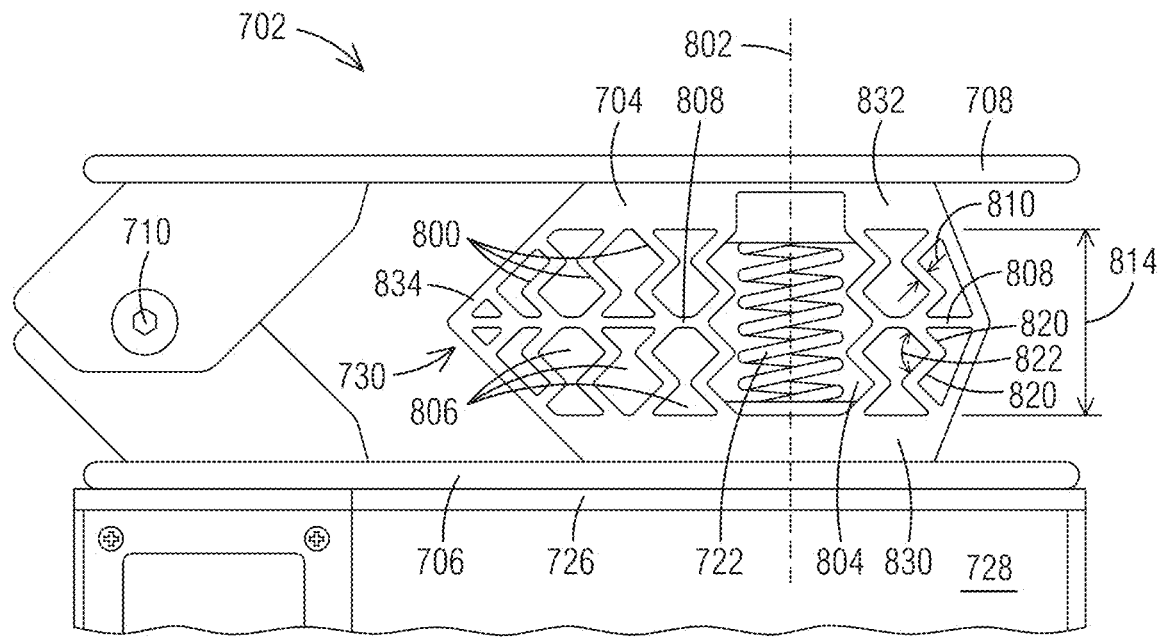
FIG. 8 shows a closeup of the independent suspension of FIG. 7.
Figure 9:
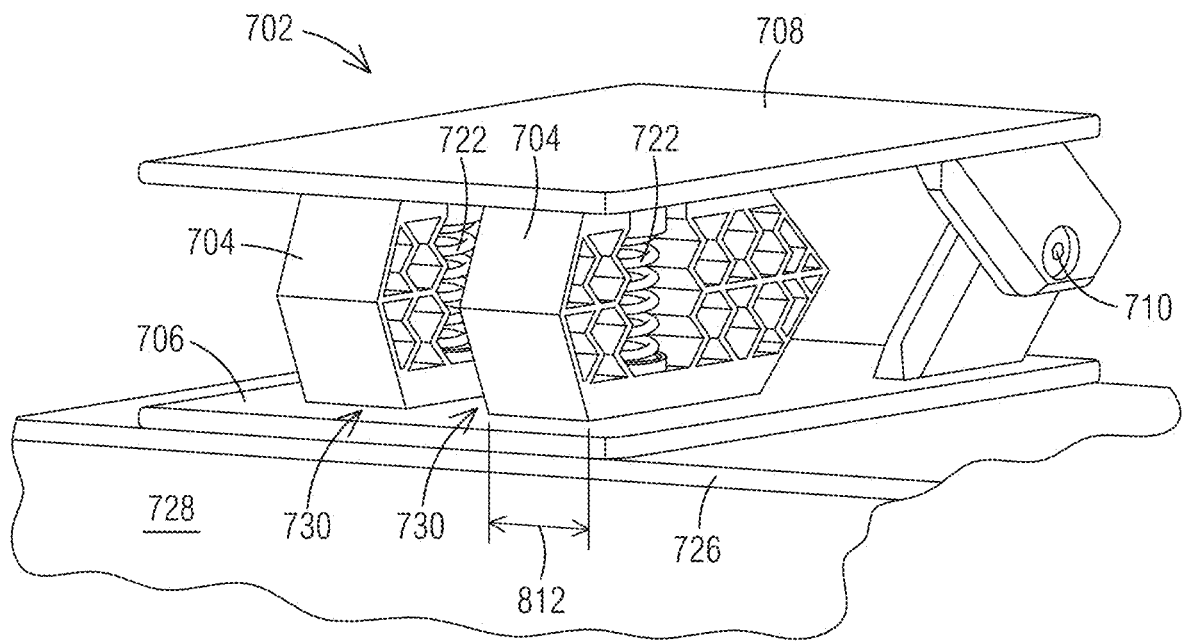
FIG. 9 shows a rear perspective view of the independent suspension of FIG. 8.

FIGS. 7-9 show an example embodiment of an independent suspension. FIG. 7 shows an example embodiment of a seat 700 and an example embodiment of an independent suspension 702 with an example embodiment of an elastomeric element 704. The elastomeric element 704 may be composed of, for example, rubber (natural or synthetic), silicone, thermoplastic polyurethane (TPU), thermoplastic elastomers (TPE), and/or or polyurethane. FIG. 8 shows a closeup of the independent suspension 702 and FIG. 9 shows rear perspective view of the independent suspension 702.

The independent suspension 702 further includes a suspension bottom member 706 (e.g., a plate), a suspension top member 708 (e.g., a plate) to which the seat 700 is mounted, and a pivot joint 710 disposed toward a front 720 of the seat 700 and connecting the suspension top member 708 to the suspension bottom member 706. The suspension bottom member 706 and the suspension top member 708 may be composed of, for example, steel, aluminum, carbon fiber, or fiberglass.

The elastomeric element 704 and a coil spring 722 are disposed toward a rear 724 of the seat 700 and keep the suspension top member 708 from reaching the suspension bottom member 706 when an occupant is sitting on the seat 700. In this example embodiment, the coil spring 722 is nested inside the elastomeric element, although this is not necessary. In this example embodiment, the suspension bottom member 706 is secured to the seat shelf 726 of the seat base assembly 728. The elastomeric element 704 and the spring 722 together constitute a suspension component 730. There may be any number of suspension components 730 in one independent suspension 702.

As can be best seen in FIG. 8, the elastomeric element 704 comprises a plurality of elastomeric zig-zag columnar elements 800. The elastomeric zig-zag columnar elements 800 are optionally disposed parallel to a longitudinal axis 802 of the spring 722 and optionally in a spring volume 804 in the example embodiment of FIG. 8. The elastomeric zig-zag columnar elements 800 are shown separated from each other by an optional gap 806. One or more optional laterally extending elastomeric elements 808 span/connect two or more of the elastomeric zig-zag columnar elements 800.

The elastomeric zig-zag columnar elements 800 and/or the laterally extending elastomeric element 808 may include, in example embodiments, a thickness 810 from 1/16 inch to 1/8 inch, a width 812 of 2 inches to 10 inches and/or up to a width of a seat supported thereon, and a height 814 of 1/2 inch to 2 3/8 inches. The elastomeric zig-zag columnar elements 800 include adjacent planar portions 820 oriented at an angle 822 to each other. Example angles include sixty (60) to one hundred twenty (120) degrees. In the example embodiment shown, the angle 822 is ninety (90) degrees. The thickness 810, the width 812, the height 814, and the angle 822 may be the same or they may vary throughout the elastomeric element 704. The elastomeric zig-zag columnar elements 800 may connect an elastomeric component bottom member 830 to an elastomeric component top member 832. The elastomeric component bottom member 830 and the elastomeric component top member 832 constitute at least part of a perimeter 834 of the elastomeric element 704, and the elastomeric zig-zag columnar elements 800 may connect to any portion of the perimeter 834 and may span all or part of the way to another location on the perimeter 834. The elastomeric zig-zag columnar elements 800 support the perimeter 834 to resist compression of the elastomeric element 704.

The elastomeric zig-zag columnar elements 800, the laterally extending elastomeric element 808, the elastomeric component bottom member 830, and/or the elastomeric component top member 832 may be composed of, for example, natural rubber (natural or synthetic), silicone, thermoplastic polyurethane (TPU), thermoplastic elastomers (TPE), and/or or polyurethane. In example embodiments, material that makes these components may be characterized by a shore hardness from 30 A to 95 A.

Figure 10A:
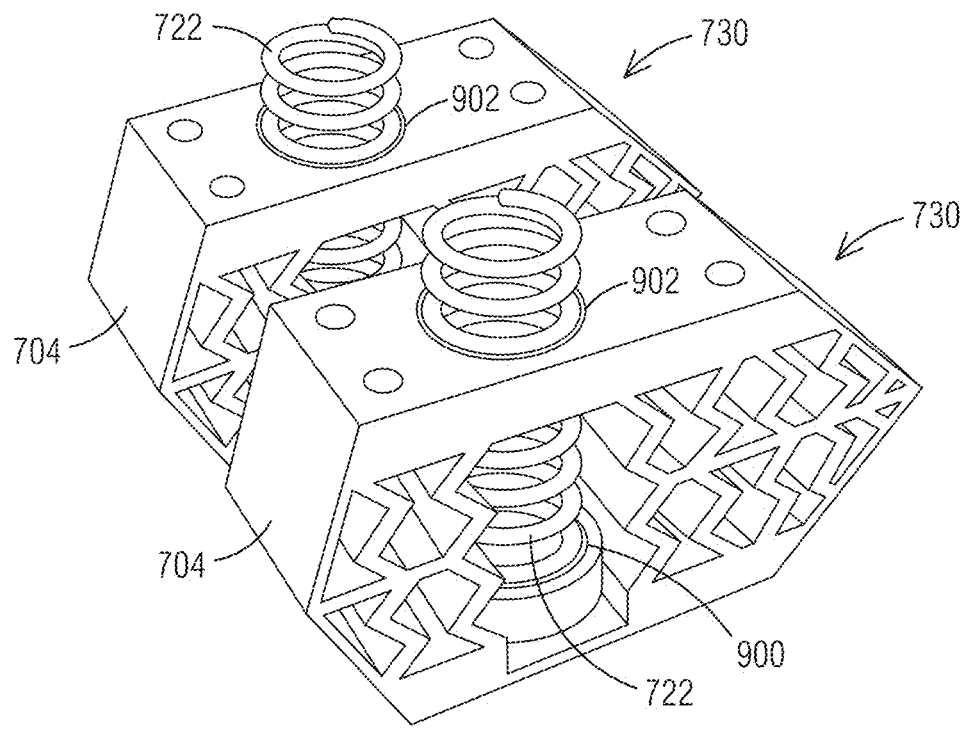
FIG. 10A shows an example embodiment of the suspension components of FIG. 9.

As can be seen in FIG. 10A, which shows the suspension components 730 alone, the suspension component 730 includes the elastomeric element 704 and the nested (coil) spring 722. In this example embodiment, the spring 722 rests in and is held in position by a well 900 an opening 902 in the elastomeric component top member 832. However, the opening 902 need not be present. In this example embodiment, there are two laterally extending elastomeric elements 808 that are disposed on opposite sides of the spring 722.

Figure 10B:
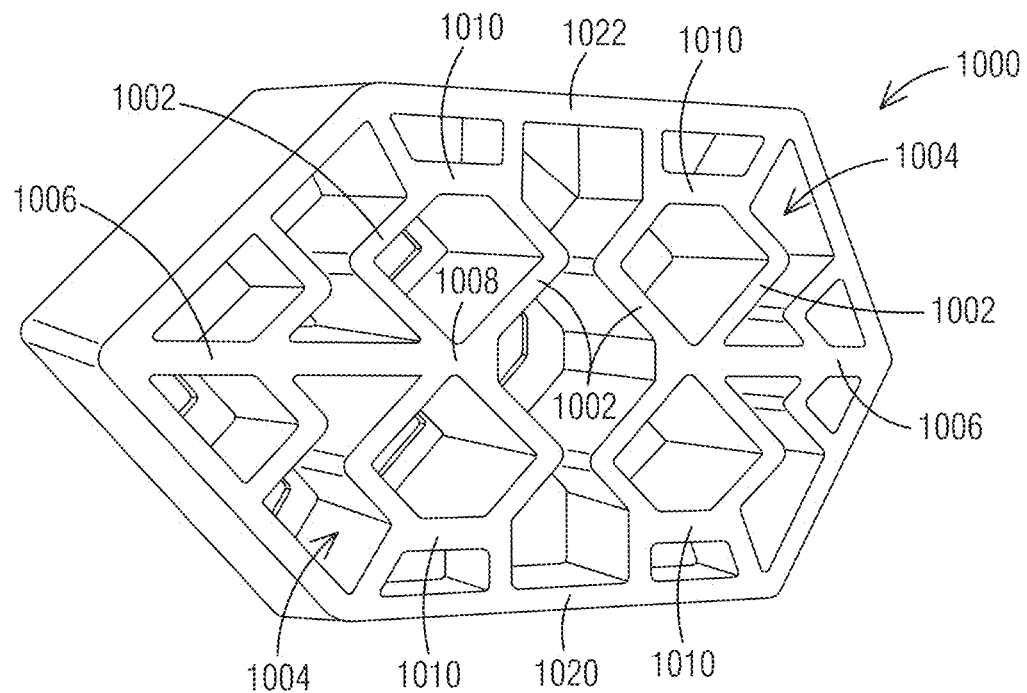
FIG. 10B shows an alternate example embodiment of the elastomeric element of the suspension component.

FIG. 10B shows an alternate example embodiment of the elastomeric element 1000. In this example embodiment, the elastomeric element 1000 does not have a spring volume to accommodate a nested spring 722. As such, when the independent suspension uses this example embodiment of the elastomeric element 1000, any spring 722 would be disposed outside of the elastomeric element 1000. The elastomeric element 1000 includes the elastomeric zig-zag columnar elements 1002, the optional gaps 1004, and the optional laterally extending elastomeric elements 1006 that span/connect two or more of the elastomeric zig-zag columnar elements 1002.

However, adjacent elastomeric zig-zag columnar elements 1002 may be connected to each other via an interface 1008 and/or additional laterally extending elastomeric elements 1010 that span/connect two or more of the elastomeric zig-zag columnar elements 1002. The elastomeric element 1000 may have a thinner elastomeric component bottom member 1020 and a thinner elastomeric component top member 1022 than the example embodiment of FIG. 8. The elastomeric element 1000 may otherwise be similar to the elastomeric element 704 described above including, but not limited to, the dimensions, materials, and other properties.

Figure 11:
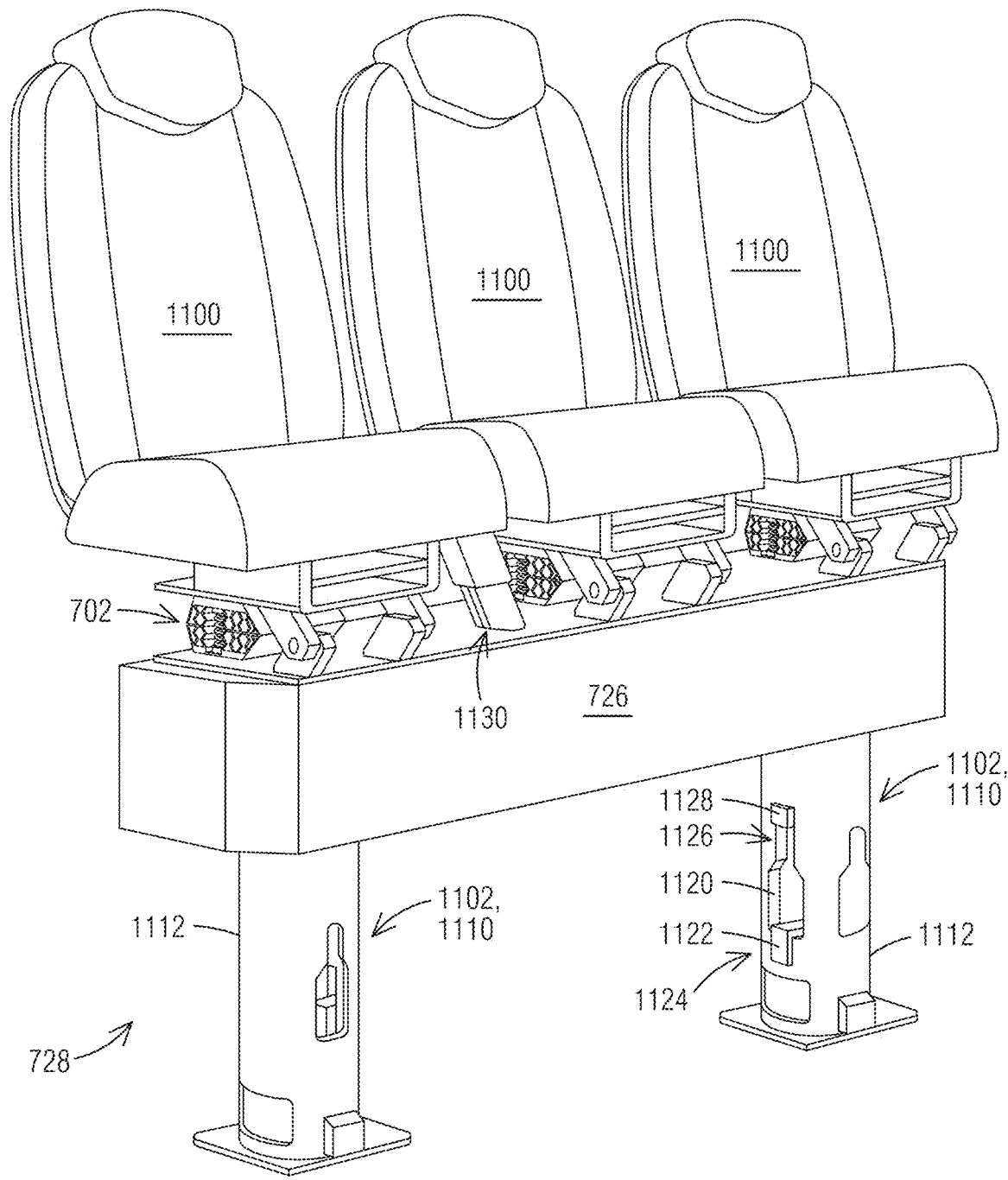
FIG. 11 shows an example embodiment of a seat disposed on the independent suspension and the seat base assembly of FIG. 7 with the seat shelf in the lowered position.
Figure 12:
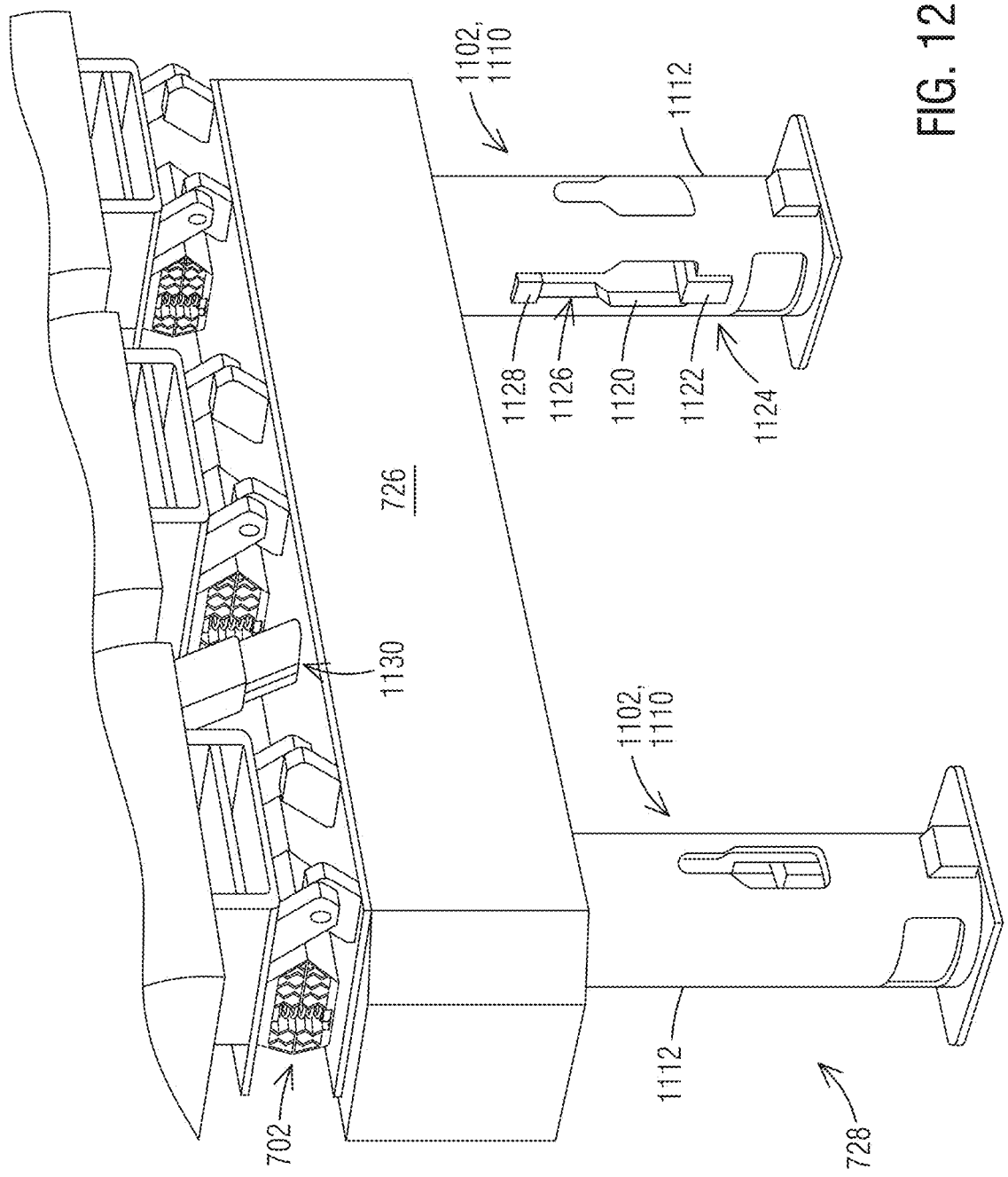
FIG. 12 shows a closeup of the seat base assembly of FIG. 11 with the seat shelf in the lowered position.
Figure 13:
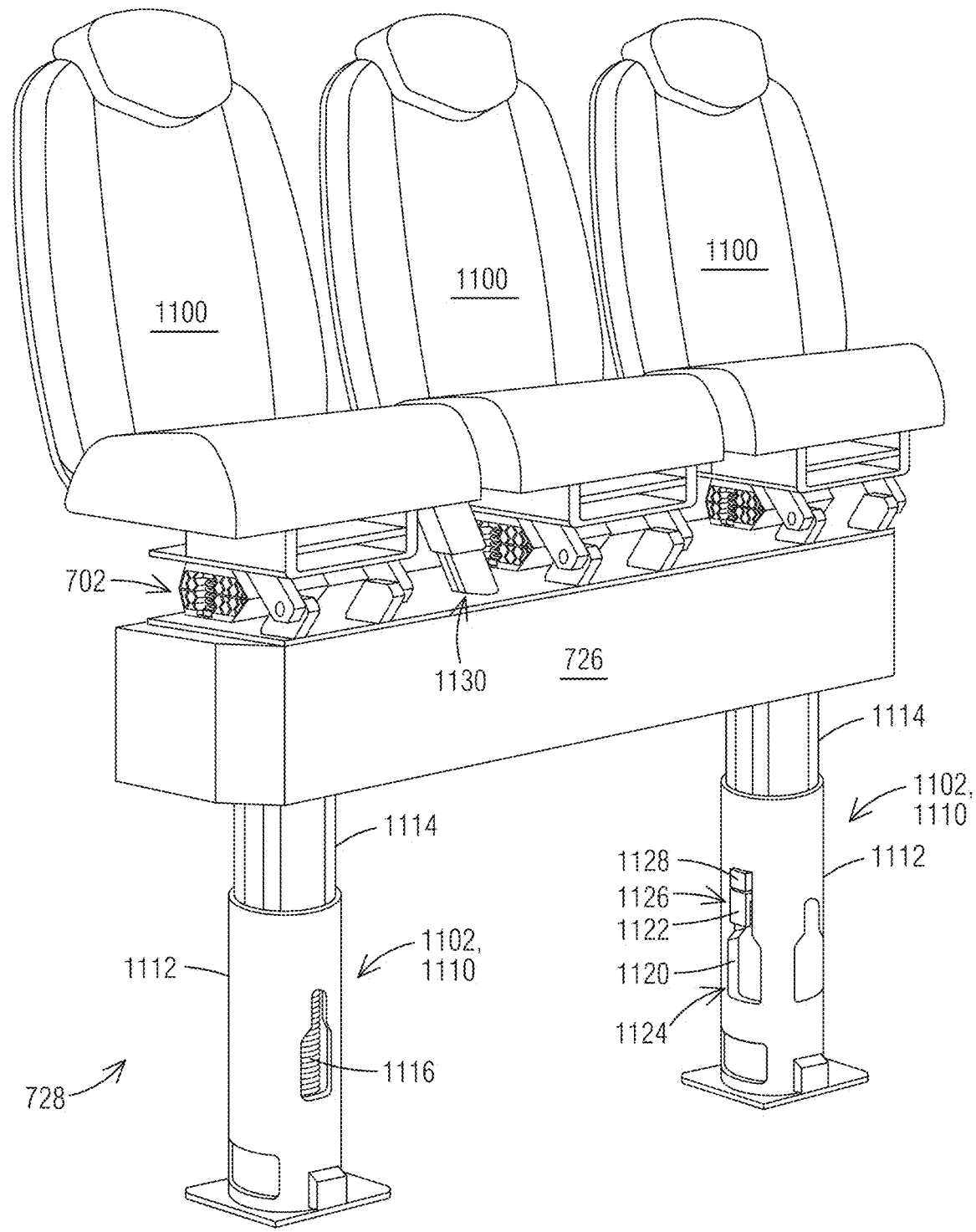
FIG. 13 shows the independent suspension and the seat base assembly of FIG. 11 with the seat shelf in the upper position.
Figure 14:
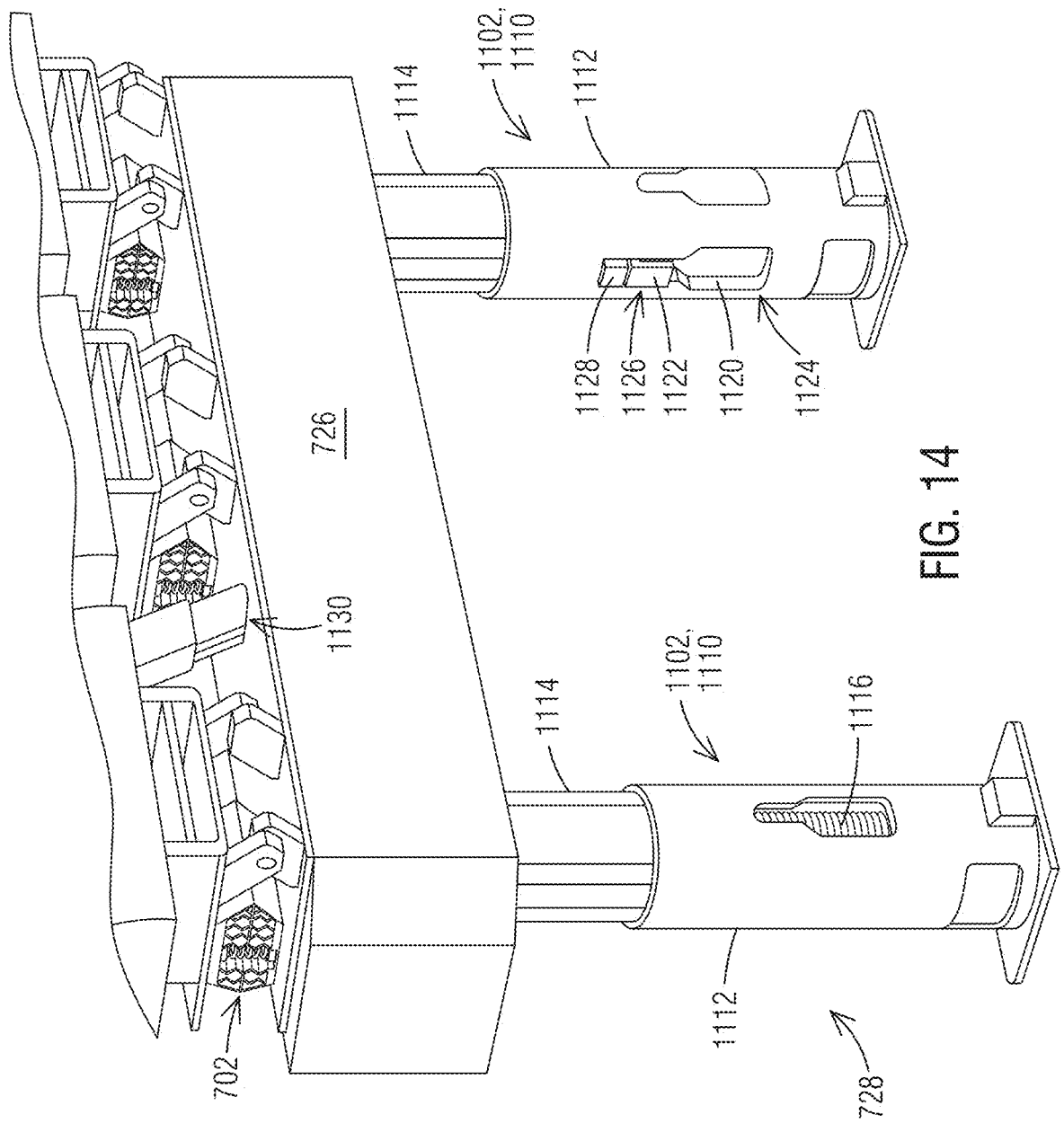
FIG. 14 shows a closeup of the seat base assembly of FIG. 13 with the seat shelf in the upper position.

FIGS. 11 and 12 show an example embodiment of a seat 1100 disposed on the independent suspension 702 and the seat base assembly 728 of FIG. 7 with the seat shelf 726 in the lowered position. FIG. 13 and FIG. 14 show the seat 1100, the independent suspension 702, and the seat base assembly 728 with the seat shelf 726 in the raised position. Included in the seat base assembly 728 are the actuators 1102, one at each end of the seat shelf 726. In this example embodiment, the actuators 1102 include a telescoping assembly 1110 secured to the seat shelf 726. The telescoping assembly 1110 includes two or more telescope members 1112, 1114 longitudinally moveable relative to one another for moving the seat shelf 726 between the lower position and the upper position. The telescoping assembly 1110 further includes a motive component 1116 (such as a piston, a motor, or the like) to effect the longitudinal movement of the telescope members 1112, 1114. The motive component 1116 in this example embodiment is a threaded rod actuator, but any suitable actuator known to the artisan can be used.

In this example embodiment, a guideway 1120 in the telescoping member 1112 guides a block 1122 that moves with the telescoping member 1114. The block 1122 is locked into in a guideway lower position 1124 when the seat shelf 726 is in the lower position, and a guideway upper position 1126 when the seat shelf 726 is in the upper position. The block 1122 may contact an upper position sensor 1128 when the seat shelf 726 is in the upper position to inform a controller of the location of the seat shelf 726 or to otherwise indicate the upward motion should stop.

In this example embodiment, a control feature 1130 is disposed within reach of a seated occupant and includes controls related at least to the operation of the seat base assembly 728. The control feature 1130 includes at least one switch that can be used to raise and lower the height of the seat shelf 726. In the example embodiment shown, the control feature 1130 extends from the seat shelf 726.

Figure 15:
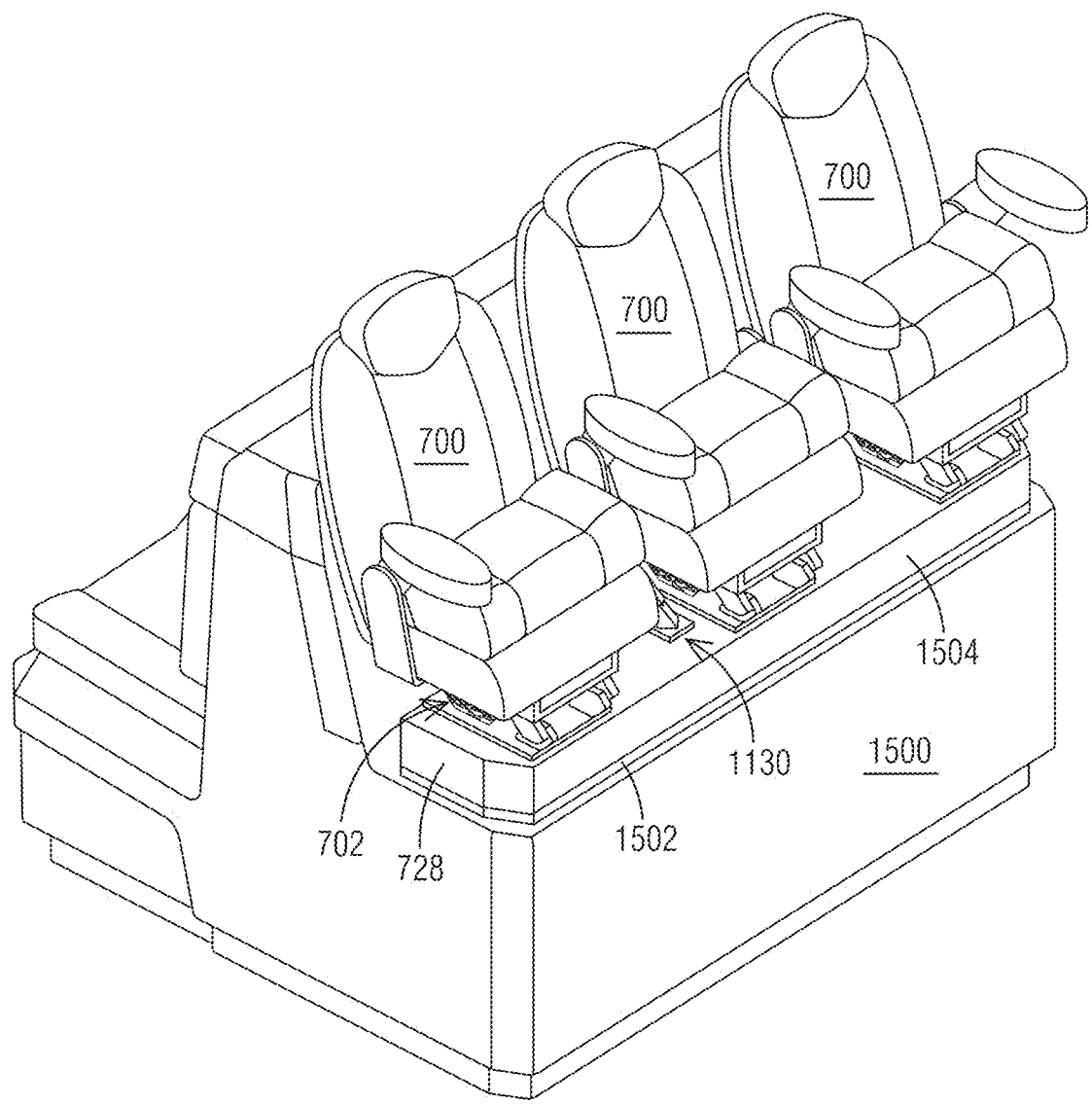
FIG. 15 shows the seat, the independent suspension, and the seat base assembly of FIG. 7 disposed in an example embodiment of the seat base console.

FIG. 15 shows the seat 700, the independent suspension 702, and the seat base assembly 728 of FIG. 7 disposed in an example embodiment of the seat base console. 1500. The seat base assembly 728 is shown protruding from the seat base console 1500 to position the seat shelf 726 in the upper position. A weather seal 1502 may be disposed between the seat base assembly 728 (e.g., a side 1504 of the seat base assembly 728) and the seat base console 1500 to form a seal to reduce or prevent water ingress.

Figure 16:
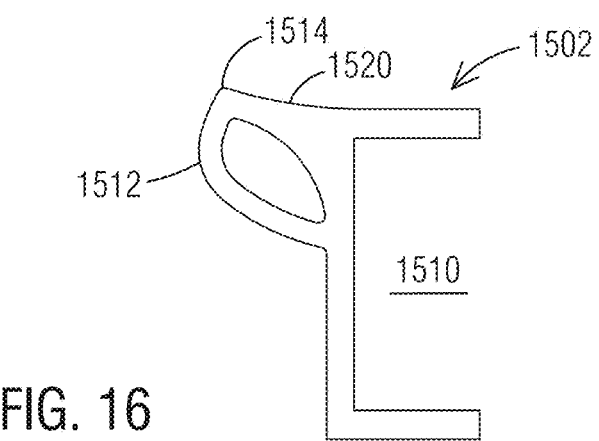
FIG. 16 shows an example embodiment of a weather seal disposed between the seat base assembly and the seat base console of FIG. 11.

FIG. 16 is a closeup of the weather seal 1502 showing a recess shaped and sized to receive and form a first seal with an edge 1510 of the seat base console, and a lip 1512 configured to abut and form a second seal with the side 1504 of the seat base assembly 728. The lip 1512 is in sliding contact with the side 1504 of the seat base assembly 728 and maintains the sealing contact as the seat base assembly 728 moves up and down, thereby preventing water from passing between the weather seal 1502 and the seat base assembly 728.

In addition, the weather seal 1502 includes a squeegee feature 1514 (e.g., a corner). When the seat base assembly 728 is lowered, friction between the side 1504 of the seat base assembly 728 and the lip 1512 drags the lip 1512 downward slightly. This draws the squeegee feature 1514 closer to the side 1504 of the seat base assembly 728 and causes the squeegee feature 1514 to act like a squeegee/wiper blade and wipe off any water disposed on the side 1504 of the seat base assembly 728, thereby preventing water ingress into the seat base console 1500. In this example embodiment the shape of the weather seal 1502 is asymmetric shape and therefore squeegee feature 1514 does not operate in the same manner when the seat base assembly 728 is raised. However, the shape may be symmetric such that two squeegee features are present, where one works when the seat base assembly 728 is raised and the other works when the seat base assembly 728 is lowered.

The weather seal 1502 also optionally includes a drain feature 1520 that is concave when unflexed and when friction from a raising/raised seat base assembly 728 raises the lip 1612. When concave, the drain feature 1520 ramps water that is under the influence of gravity away from the side 1504 of the seat base assembly 728. The weather seal 1502 is further configured so that when the lip 1512 and associated squeegee feature 1514 are dragged down slightly by the friction between it and the side 1504 of a lowering/lowered seat base assembly 728, the drain feature 1520 either remains concave or flattens out without inverting into a convex shape. A flat drain feature 1520 will at least prevent squeegeed water from bunching up at the lip 1512, and a concave drain feature 1520 even with reduced concavity will still ramp water away. In light of the above, the apparatus disclosed represents an improvement in the art by providing a captain with a wide range of operating positions that are suitable for a wide range of operating conditions.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. A suspension component, comprising:
   an elastomeric component top member;
   an elastomeric component bottom member; and
   a plurality of elastomeric zig-zag columnar elements that connect the elastomeric component top member to the elastomeric component bottom member and that are separated from each other by a gap; and
   a coil spring, wherein elastomeric zig-zag columnar elements of the plurality of elastomeric zig-zag columnar elements are disposed parallel to a longitudinal axis of the coil spring, and wherein the coil spring is nested within the plurality of elastomeric zig-zag columnar elements;
   wherein the elastomeric zig-zag columnar elements of the plurality of elastomeric zig-zag columnar elements are joined by a laterally extending elastomeric element; and
   wherein the elastomeric zig-zag columnar elements of the plurality of elastomeric zig-zag columnar elements comprise adjacent planar portions oriented at ninety degrees to each other.

2. The suspension component of claim 1, wherein the elastomeric zig-zag columnar elements of the plurality of elastomeric zig-zag columnar elements comprise rubber.

3. The suspension component of claim 1, wherein the elastomeric zig-zag columnar elements of the plurality of elastomeric zig-zag columnar elements comprise a thickness of $1/16$ inch to $1/8$ inch, a width of 2 inches to 10 inches, and a height of $1/2$ inch to $2 3/8$ inches.

4. A suspension component, comprising:
   an elastomeric component perimeter; and
   a plurality of elastomeric zig-zag columnar elements spaced apart from each other and configured to support the elastomeric component perimeter and thereby resist compression of the suspension component, wherein elastomeric zig-zag columnar elements of the plurality of elastomeric zig-zag columnar elements comprise adjacent planar portions oriented at ninety degrees to each other;
   wherein the elastomeric zig-zag columnar elements of the plurality of elastomeric zig-zag columnar elements are joined by a laterally extending elastomeric element; and
   a coil spring nested within the plurality of elastomeric zig-zag columnar elements and configured to resist the compression of the suspension component.

5. The suspension component of claim 4, wherein the elastomeric component perimeter comprises an elastomeric component top member and an elastomeric component bottom member, wherein the elastomeric zig-zag columnar elements of the plurality of elastomeric zig-zag columnar elements connect the elastomeric component top member to the elastomeric component bottom member.

6. The suspension component of claim 5, wherein the elastomeric zig-zag columnar elements are separated from each other by a gap.

7. The suspension component of claim 4, wherein the elastomeric zig-zag columnar elements of the plurality of elastomeric zig-zag columnar elements and the coil spring are oriented parallel to each other.

8. The suspension component of claim 4 wherein the elastomeric component perimeter comprises an elastomeric component top member and an elastomeric component bottom member, and wherein the elastomeric component bottom member comprises a well in which the coil spring rests.

9. The suspension component of claim 4, wherein the suspension component is configured to support a seat disposed thereon.

10. A suspension component, comprising:
    a plurality of elastomeric zig-zag columnar elements arranged parallel to each other, spaced apart from each other, and configured to resist compression of the suspension component, wherein elastomeric zig-zag columnar elements of the plurality of elastomeric zig-zag columnar elements comprise adjacent planar portions oriented at ninety degrees to each other;
    a coil spring nested within and oriented parallel with the plurality of elastomeric zig-zag columnar elements, held in position by the suspension component, and configured to resist the compression of the suspension component; and
    an elastomeric component top member and an elastomeric component bottom member, wherein the elastomeric zig-zag columnar elements connect the elastomeric component top member to the elastomeric component bottom member; and
    wherein the elastomeric zig-zag columnar elements form respective connections to the elastomeric component top member at different respective locations on the elastomeric component top member.

11. The suspension component of claim 10, wherein the elastomeric zig-zag columnar elements of the plurality of elastomeric zig-zag columnar elements are joined by a laterally extending elastomeric element.

12. The suspension component of claim 11, wherein the laterally extending elastomeric element is one of two laterally extending elastomeric elements that are disposed on either side of the coil spring.

* * * * *